United States Patent [19]

West

[11] 4,313,625
[45] Feb. 2, 1982

[54] LINED PIPE ASSEMBLY

[75] Inventor: Walter H. West, Essexville, Mich.

[73] Assignee: The Dow Chemical Company, Midland, Mich.

[21] Appl. No.: 191,181

[22] Filed: Sep. 26, 1980

Related U.S. Application Data

[63] Continuation of Ser. No. 43,867, May 29, 1979, abandoned.

[51] Int. Cl.³ .......................... F16L 9/14; F16L 23/00
[52] U.S. Cl. ........................................ 285/55; 285/408
[58] Field of Search ................. 285/55, 367, 408, 366, 285/365, 411, 410, DIG. 12

[56] References Cited

U.S. PATENT DOCUMENTS 2,919,936 1/1960 Hurley .
3,335,758 8/1967 Bertolet, Jr. .
3,398,978 8/1968 Gasche .

FOREIGN PATENT DOCUMENTS 561772 10/1932 Fed. Rep. of Germany .
1268456 5/1968 Fed. Rep. of Germany .
1012286 4/1952 France .

Primary Examiner—Thomas F. Callaghan
Attorney, Agent, or Firm—R. B. Ingraham

[57] ABSTRACT

An improved lined pipe assembly is provided wherein the lined pipe and liner are deformed to provide an outwardly flaring flange, a loose tapered ring is disposed on the pipe adjacent the flange and the pipe joined to a similar pipe or cast fitting by means of a split "V" clamp. Highly reliable joints are obtained.

2 Claims, 5 Drawing Figures

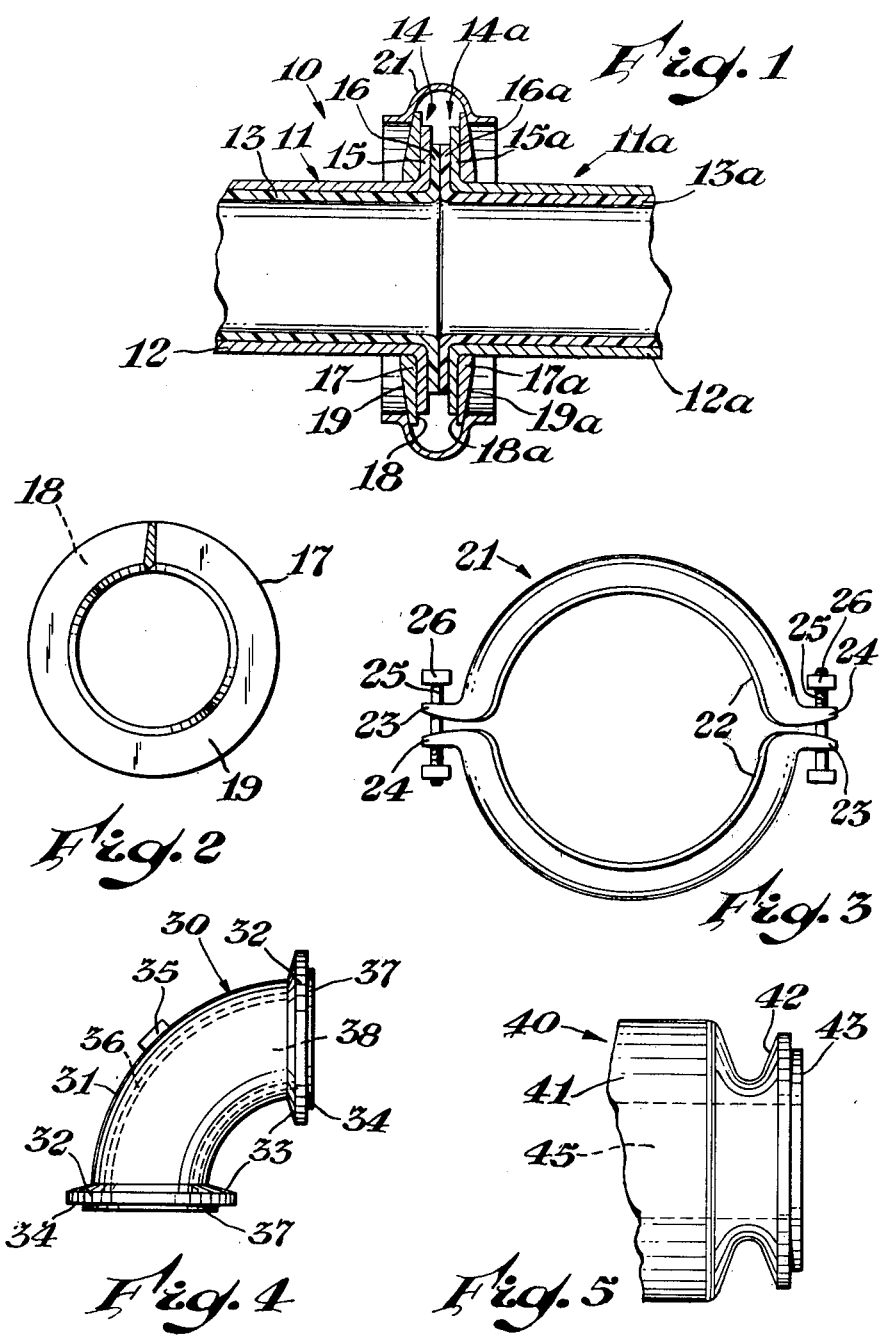

LINED PIPE ASSEMBLY

This is a continuation of application Ser. No. 43,867, filed May 29, 1979, now abandoned.

For many years pipe and like conduit has been employed to transport liquids of varying corrosive nature. Oftentimes materials which provide the desired resistance to corrosion do not provide adequate physical properties to resist the stresses normally applied to a pipe or similar conduit. Therefore, two-layer conduits have been employed wherein a corrosion resistant lining is applied to a conduit having the desired physical resistance, for example, rubber lined steel or wood lined steel pipe. Of considerable commercial importance are plastic lined steel pipes. Some such lined pipe is lined with a thermoset resin while others are lined with thermoplastic resins. For many applications a particularly desirably combination is a thermoplastic liner of substantial thickness; for example, in a 2 inch nominal pipe a liner may be as thick as 5 millimeters while the pipe wall may be on the order of 3.5 millimeters in thickness. Such lined pipe provides excellent service. However, it is relatively heavy, cumbersome to handle when used in situations where frequent disassembly is required. Further, a wide variety of joints may be employed for such piping. One highly desirable joint is prepared by removing a terminal portion of the pipe, applying a flange to the pipe and subsequently flanging the protruding liner to conform to the flange. Such techniques are disclosed in U.S. Pat. Nos. 3,335,484; 3,383,750; 3,390,442; 3,448,491; 3,461,505; 3,650,550. Means of joining such pipes are disclosed in U.S. Pat Nos. 3,284,107 and 3,284,108. Light weight plastic lined pipe is disclosed in U.S. Pat Nos. 3,838,823 and 3,742,590. A particularly convenient means of flaring both pipe and liner simultaneously is disclosed in U.S. Pat. No. 3,744,115, the teachings of the foregoing U.S. Patents are incorporated herewith by reference thereto.

It would be desirable if there were available an improved plastic lined pipe conduit assembly which were light in weight.

It would be desirable also if there were available an improved plastic lined pipe assembly of light weight which provides a strong reliable joint between elements in the piping system.

These benefits and other advantages are achieved in the improved pipe joint, the pipe joint comprising at least a first plastic lined conduit having a synthetic resinous pressure deformable liner disposed within a pressure deformable metal conduit, the first plastic lined conduit having at least one end, the conduit end defining a radially outwardly projecting flange composed of deformed metal of the metal conduit and deformed plastic of the liner, a loose ring having a generally planar face is disposed about the conduit against the metal flange, the loose ring having a tapering face remote from the metal flange, the tapering face tapering outwardly toward a periphery of the metal flange, a split "V" clamp disposed about the loose ring and an opposed surface of generally like configuration, and split "V" clamp thereby forcing the plastic liner against an opposed sealing face.

Further features and advantages of the present invention will become more apparent from the following specification taken in connection with the drawing wherein:

FIG. 1 is a sectional view of a joint in accordance with the present invention between two conduits;

FIG. 2 is a representation of loose ring and section thereof employed in the joint of FIG. 1;

FIG. 3 is a view of the split "V" clamp of FIG. 1;

FIG. 4 depicts an elbow suitable for the practice of the present invention,

FIG. 5 is a fractional view of one flange of a lined valve for use with the present invention.

In FIG. 1 there is depicted a conduit joint in accordance with the present invention generally designated by numeral 10. The conduit joint comprises a first conduit 11 and a second conduit 11a of like construction. The conduit 11 has a generally hollow cylindrical metal body 12 having disposed therein a hollow deformable plastic liner 13. The conduit 11 terminates in a flange generally designated by the reference numeral 14. Flange 14 is generally radially outwardly extending and comprises a first or metal portion 15 and a sealing or plastic liner portion 16 which is in engagement with a like flange portion 16a. Loose rings 17 and 17a are disposed about the conduits 11 and 11a respectively. The loose ring 17 has a generally planar radially extending face 18 disposed immediately adjacent the flange 14. The loose ring 17 has a tapering face 19 which tapers toward the flange 14 and is disposed remote therefrom. Conduit 11a is of similar construction wherein like components are designated by like reference numerals having the suffix "a". A split "V" clamp 21 is disposed about the loose rings 17 and 17a and engages the tapering faces 19 and 19a forcing the flange portions 16 and 16a into sealing engagement.

In FIG. 2 there is depicted a planar view of split ring 17 showing the tapered face 19 and the cross section of the split ring is superimposed on the uppermost portion thereof.

FIG. 3 depicts the split ring "V" clamp 21 in open configuration. The split ring "V" clamp 21 comprises two identical halves designated by the reference numeral 22. Each half 22 comprises a generally semicircular channel of the configuration depicted in FIG. 1 terminating in a first or narrow generally radially extending lug 23. A second end of the half 22 terminates in a broad lug 24. The lugs 23 and 24 each define a passage therein in which is depicted a bolt 25 having a nut 26.

In preparation of a joint such as is shown in FIG. 1, a loose ring is placed over the end of the pipe to be joined wherein the planar face of the ring is disposed adjacent the end of the tapering face, disposed remote from the end. The end of the pipe or conduit is then flanged, for example by the method set forth in U.S. Pat. No. 3,744,155 which discloses forming flange and liner simultaneously by hydraulic pressure developed by deforming an elastomeric plug. To prepare the joint of FIG. 1 a second such conduit end is prepared and placed in abutting relationship. The split "V" clamp 21 is applied over the loose rings 17 and 17a and tightened to provide an appropriate sealing force for the particular material of the plastic flange and conduit size.

In FIG. 4 there is depicted a plastic lined fitting in accordance with the present invention and generally designated by the reference numeral 30. The fitting of 30 as shown in FIG. 4 is a 90° elbow having an outer housing 31 of metal, advantageously cast steel or the like. At both ends of the fitting 31 are disposed like flanges 32. The flanges 32 advantageously are cast integral with the body 31. The flanges 32 have a first or tapering face 33. The faces 33 thin as their diameter increases away from the body 31. The flanges 32 have generally planar radially extending faces 34 remote from the faces 33. The body 31 defines an indexing tab 35 which is merely a reference projection conveniently used when the housing 31 is provided with a plastic liner 36. The plastic liner 36 covers the entire inner surface of the body 31 and a major portion of the surfaces 34 of the body 31 with the plastic flange portions 37. The liner 36 defines an internal passageway 38 providing full communication from one end of the elbow to the other; thus the elbow provides for the free passage of fluid within the liner 36 from one end of the elbow to the other.

Other fittings such as tees and Y's, crosses, reducers, blind flanges, caps and the like are readily prepared for use with the present invention. The tapering flange configuration is readily employed with such a variety of fittings. Valves for use with the present invention beneficially are prepared from conventional flanged valves where the conventional flange is turned or milled to a configuration such as depicted in FIG. 5.

In FIG. 5 there is depicted a fractional view of a valve for use with the present invention, the valve being generally designated by the reference numeral 40, the valve having a body portion 41, a flange portion 42 and a plastic liner portion 43. The configuration of the flange 42 being generally identical to the flange 32 of the fitting of FIG. 4 and the liner portion being generally identical to the flanges 37 of FIG. 4. Valve 40 has defined therein a fluid passage 45.

Piping systems prepared in accordance with the present invention are particularly convenient for assembly as there are no fixed flanges, and any element in the system may be rotated to any desired degree and readily clamped in sealing relationship. The present invention provides joints of remarkable desirability when subjected to heating and cooling cycles. Tightening of the joints is not required as frequently with thermoplastic lines as employed in more rigid systems. It is believed that the split ring conduit flanges of the split "V" clamp provide a degree of resiliency which tends to reduce cold flow of the liner flange while maintaining reliable sealing pressure. Joints in accordance with the present invention show excellent load bearing properties particularly when placed under loads which are coaxial with the conduits. Such joints whether conduit-to-conduit or conduti-to-fitting are satisfactory for services to 150 pounds per square inch when a Schedule 10 steel conduit is employed with a plastic lining having a thickness of 1/16 of an inch.

As is apparent from the foregoing specification, the present invention is susceptible of being embodied with various alterations and modifications which may differ particularly from those that have been described in the preceeding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved pipe joint, the pipe joint comprising a plastic lined conduit having a synthetic resinous pressure deformable liner disposed within a pressure deformable metal conduit, said plastic lined conduit having at least one end, the conduit end defining a radially outwardly projecting flange composed of deformed metal of the metal conduit and deformed plastic of the liner, a loose ring having a generally planar face and a tapering face, the loose ring being disposed about the conduit with the generally planar face of the ring disposed against a metal portion of the outwardly projecting flange, the loose ring having the tapering face remote from the radially outwardly projecting flange, the tapering face tapering outwardly toward a periphery of the flange, a split "V" clamp disposed about the loose ring and an opposed tapering surface of generally like configuration to the tapering face of the loose ring, and the split "V" clamp thereby forcing the deformed plastic of the liner against an opposed liner engaging sealing surface.

2. An improved pipe joint, the pipe joint comprising a first and second plastic lined conduit, each plastic lined conduit having a synthetic resinous pressure deformable liner disposed within a pressure deformable metal conduit, each of said plastic lined conduits having at least one end, each of the conduit ends defining a generally radially outwardly projecting flange composed of deformed metal of the metal conduit and deformed plastic of the liner, each of the conduits having a loose ring, each of the loose rings having a generally planar face and a tapering face, each of the loose rings being disposed about an associated conduit wherein the generally planar face of the ring is disposed against a metal portion of the outwardly projecting flange, each of the loose rings having a tapering face remote from the radially outwardly projecting flange, the tapering faces of the loose rings tapering outwardly toward a periphery of the flange, a split "V" clamp disposed about the loose rings and opposed tapering surfaces of the loose ring, the split "V" clamp thereby forcing the deformed plastic of the liners against each other to cause the deformed plastic liners to be in sealing engagement.

* * * * *

UNITED STATES PATENT AND TRADEMARK OFFICE
CERTIFICATE OF CORRECTION

PATENT NO. : 4,313,625　　　　　　　　　　　　　　　Page 1 of 2

DATED : Feb. 2, 1982

INVENTOR(S) : Walter H. West

It is certified that error appears in the above-identified patent and that said Letters Patent are hereby corrected as shown below:

On the title page under [56] References Cited, U.S. PATENT DOCUMENTS should include:

| | | |
|---|---|---|
| 2,201,862 | 5/1940 | Heisterkamp |
| 2,359,952 | 10/1944 | Welger |
| 2,519,847 | 8/1950 | Neely |
| 2,779,996 | 2/1957 | Tanis |
| 2,998,984 | 9/1961 | Gressel |
| 3,144,264 | 8/1964 | Lewis et al |
| 3,235,291 | 2/1966 | Jacoby |
| 3,323,552 | 6/1967 | Whitehead, Jr. |
| 3,406,991 | 10/1968 | Decker, Jr. et al. |
| 3,551,006 | 12/1970 | James |
| 3,742,590 | 7/1973 | Douglas | and FOREIGN DOCUMENTS should include:

| | | |
|---|---|---|
| 598,864 | 10/1959 | Italy |
| 820,884 | 9/1959 | Great Britain |
| 987,126 | 3/1965 | Great Britain |

UNITED STATES PATENT AND TRADEMARK OFFICE
CERTIFICATE OF CORRECTION

PATENT NO. : 4,313,625

DATED : Feb. 2, 1982

INVENTOR(S) : Walter H. West

It is certified that error appears in the above-identified patent and that said Letters Patent are hereby corrected as shown below:

Column 3, line 47 reading "conduti" should read --conduit--.

Column 4, line 49 reading "ring," should read --rings,--.

Signed and Sealed this

Ninth Day of November 1982

[SEAL]

Attest:

GERALD J. MOSSINGHOFF

Attesting Officer

Commissioner of Patents and Trademarks